United States Patent [19]

Miller

[11] Patent Number: 5,503,450
[45] Date of Patent: Apr. 2, 1996

[54] TRUCK LID LIFT SYSTEM

[75] Inventor: Aden L. Miller, Apple Creek, Ohio

[73] Assignee: A.R.E., Inc., Mount Eaton, Ohio

[21] Appl. No.: 317,165

[22] Filed: Oct. 3, 1994

[51] Int. Cl.⁶ .................................................. B60P 7/02
[52] U.S. Cl. ................................................... 296/100
[58] Field of Search ........................................ 296/100

[56] References Cited

U.S. PATENT DOCUMENTS

| | | | |
|---|---|---|---|
| 4,083,596 | 4/1978 | Robertson | 296/100 |
| 4,673,208 | 6/1987 | Tsukamoto | 296/100 X |
| 5,011,214 | 4/1991 | Friesen et al. | 296/100 |
| 5,094,499 | 3/1992 | Simone, Jr. | 296/100 |
| 5,275,459 | 1/1994 | Haddad, Jr. | 296/100 |

*Primary Examiner*—David M. Mitchell
*Assistant Examiner*—Kia M. Robinson
*Attorney, Agent, or Firm*—Renner, Kenner, Greive, Bobak, Taylor & Weber

[57] ABSTRACT

A lid lift system wherein a lift piston is mounted within a wheeled vehicle bed to actuate a lift member which will slidingly move along a slide rail track to open and close a lid upon the wheeled vehicle bed. Furthermore, the lift piston can either be activated by a toggle switch located in the truck cab or by a remote control. Additionally, the lid lift system is configured such that it can either be factory installed or installed by a customer.

12 Claims, 3 Drawing Sheets

TRUCK LID LIFT SYSTEM

TECHNICAL FIELD

The invention herein resides generally in the art of coverings for the bed portion of a pickup truck or similar wheeled vehicle. More particularly, the present invention relates to a remotely actuated closure device for covering the bed of a pickup truck or similar vehicle. Specifically, the present invention relates to a remotely actuated piston for engaging a lift member that will pivotally move a closure device to cover the bed of a pickup truck, or similar wheeled vehicle.

BACKGROUND ART

With the advent of the automobile, it has become desirable to use the automobile or a truck type vehicle for hauling materials such as equipment and the like from one destination to another. To this end, automobiles and trucks have been modified into the form of pickup trucks. Pickup trucks are versatile in that heavy, bulky items, such as engine blocks or the like may be stored in the bed thereof, and driven to the desired location in a vehicle having the handling characteristics and amenities of the everyday passenger vehicle. Typically, the bed of these pickup trucks will be provided with features such as retaining hooks to assist in tying down the equipment to be moved, prevent shifting of the load, and bed liners to prevent damage to the interior of the bed, thus extending the life and usefulness of the vehicle. It is also known in the art, to provide storage bins within the truck bed to protect smaller tools and valuable personal items.

Pickup truck beds can be modified by affixing metal or rigid plastic caps thereto. These caps are secured to the periphery of the bed and provide protection so that various materials and equipment may be stored therein, while protecting the stored items from natural elements such as sun, rain, or snow. Furthermore, known caps will permit passengers to ride in the bed portion of the truck while being protected from the elements. Additionally, known caps may be used to protect individuals from the elements while camping or on other overnight trips.

Another method for protecting the equipment hold and the bed portion of a pickup truck is to cover the bed of the pickup truck with either canvas, plastic, or heavy duty leather. These coverings will be secured to the bed of the pickup truck by either bungee cords, rope, or snap fasteners. However, these coverings are subject to much wear and tear and do not provide complete protection for equipment stored in the bed of the truck. Nor is there a facile means for attaching and detaching these covers.

It is further known that a closure for the bed of a pickup truck gives the truck a more attractive appearance by concealing otherwise unsightly items from view. Additionally, such closures can be tailored to enhance the overall appearance of the pickup truck. However, such closures also impede access to the truck bed. Accordingly, there is a need for an automatic lift system for such closures.

It is clear that there is a need in the art for a rigid cover to enclose a pickup truck bed or bed of any wheeled vehicle that can be lifted mechanically by a remotely controlled actuator. There is also a need in the art for a lid lift system that is easily maintainable and that can be either factory installed or installed by the owner of the vehicle. There is a further need for a lid lift system as aforesaid which is not easily scratched, torn, or damaged. Furthermore, there is a need to provide such a lid lift system that protects any and all equipment stored in the bed of the vehicle.

DISCLOSURE OF THE INVENTION

In light of the foregoing, it is a first aspect of the present invention to provide a rigid and sturdy covering for any opening of a wheeled vehicle and particularly the bed of a pickup truck.

Another aspect of the present invention is to provide a remotely actuated piston for engaging a lift member that will pivotally move a closure device to cover the bed of a pickup truck or wheeled vehicle.

Still a further aspect of the present invention is to provide a truck lid lift system that will pivotally move a closure device to cover the bed of a truck that is actuated either by a toggle switch in the cab of the pickup truck or by remote control.

An additional aspect of the present invention is to provide a truck lid lift system that will pivotally move a closure device onto the periphery of the truck bed that can be either factory installed or installed by the consumer.

Yet an additional aspect of the present invention is to provide a truck lid lift system that provides a rigid cover to protect the contents of the truck bed from natural elements such as wind, rain, and snow while giving the truck bed portion an aesthetically pleasing appearance.

The foregoing and other aspects of the invention which shall become apparent as the detailed description proceeds, are achieved by a lid lift system, comprising: a closure member mateably engagable with a bed of a wheeled vehicle; a lid arm; an extension arm integrally extending from the lid arm, the extension arm mounted to the wheeled vehicle bed; a piston assembly securably mounted to the wheeled vehicle bed and having a lift piston actuatable by an operator, the lift piston being mounted onto the extension arm; and attachment means for interconnecting the lid arm to the closure member so that when the lift piston is activated, the closure member reciprocates between an open position and a closed position, wherein the attachment means comprises, at least one slide rail securably mounted to said closure member, the slide rail having a channel for slidably receiving a slide member, and a U-clamp secured to the slide member, the lid arm received within the U-clamp and the slide member, the lid arm moving the slidable member and the closure member to a desired position when the lift piston is actuated.

The present invention also provides a lid lift system, comprising a lid rail assembly securably attachable to a truck bed, the lid rail assembly having a pair of edge rails substantially perpendicular to a hinge rail, the pair of edge rails secured to the truck bed; a closure member mateably engagable with the lid rail assembly; a lift bar slidably connected at one end to the closure member and pivotally mounted at an opposite end to the lid rail assembly, the lift bar having a lid arm from which extends at one end a curvilinear extension arm having a curvilinear section and at an opposite end an extension arm, the curvilinear extension arm pivotally mounted to one of the edge rails at the vertex of the curvilinear extension arm and the curvilinear section, and the extension arm pivotally mounted to the other of the edge rails; a lift piston actuatable by an operator, the lift piston mounted at one end to one of the edge rails and at the opposite end pivotally mounted to the curvilinear section; and a slide rail assembly mounted to the closure member by at least one slide rail with a channel for slidably receiving a slide member, wherein the slide member is mounted to the lid arm and slidably moves when the lift piston is actuated to reciprocate the closure member between an open position and a closed position with respect to the lid rail assembly.

The present invention also contemplates a lid lift system for reciprocating a closure member upon a bed of a truck, comprising: a lid rail assembly securably attachable to a truck bed, the lid rail assembly having a pair of edge rails substantially perpendicular to a hinge rail, the pair of edge rails secured to the truck bed; a closure mateably engagable with the lid rail assembly; a lift bar rotatably connected at one end to the closure member at an opposite end to the lid rail assembly, said lift bar having a lid arm from which extends at one end a curvilinear extension arm having a curvilinear section and at an opposite end an extension arm, the curvilinear extension arm pivotally mounted to one of the edge rails at the vertex of the curvilinear extension arm and the curvilinear section, and the extension arm pivotally mounted to the other of the edge rails; a lift piston actuable by an operator, the lift piston mounted at one end to one of the edge rails and at the opposite end pivotally mounted to the curvilinear section; a lift piston actuable by an operator, the lift piston mounted at one end to one of the edge rails and at the opposite end pivotally mounted to the curvilinear section; and a slide rail assembly mounted to the closure member by at least one slide rail with a channel for slidably receiving a slide member, wherein the slide member is mounted to the lid arm and slidably moves when the lift piston is actuated to reciprocate the closure member between an open position and a closed position with respect to the lid rail assembly.

BEST MODE FOR CARRYING OUT THE INVENTION

Figure 1:
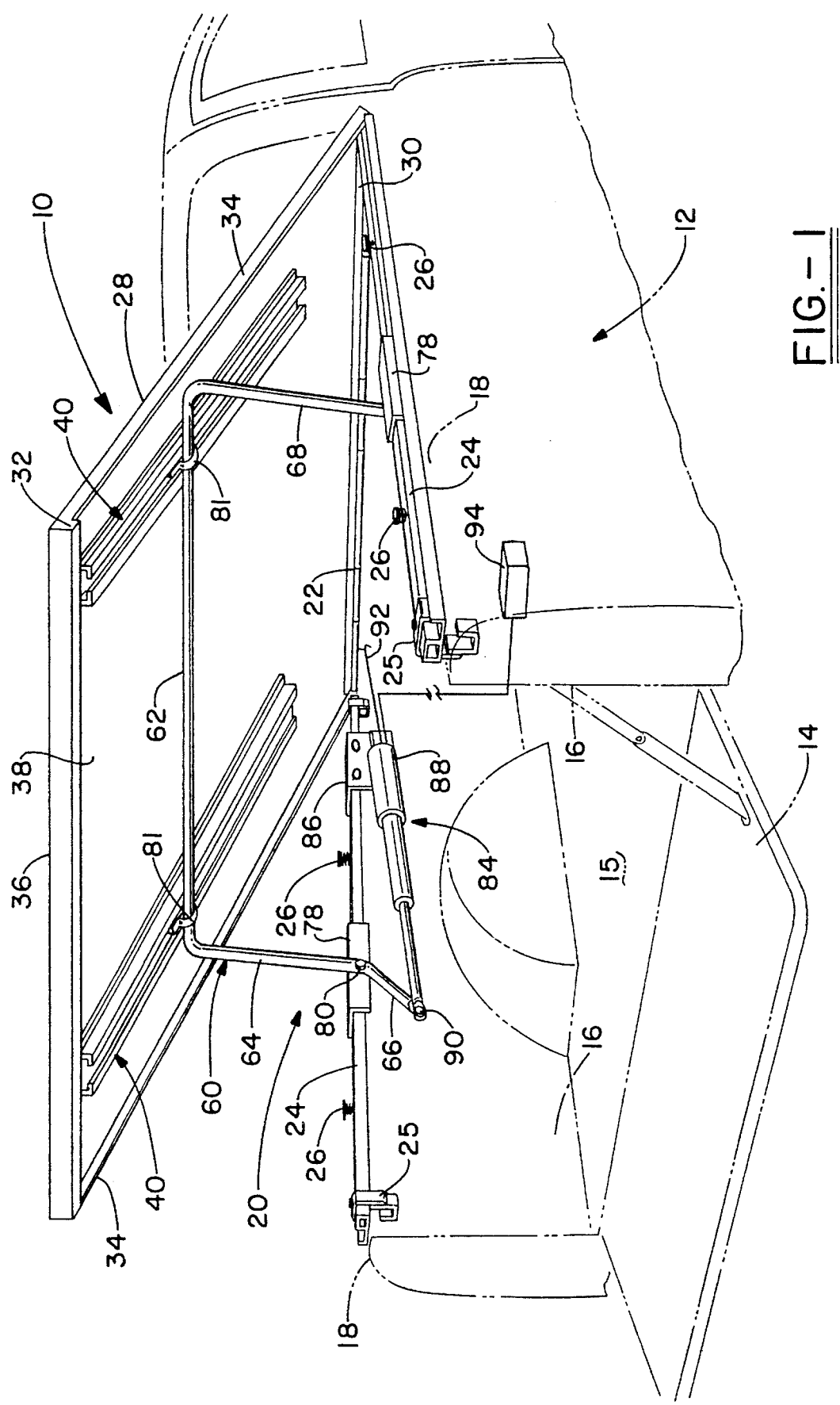
FIG. 1 is a perspective view illustrating a lid lift system comprising the present invention as such may be applied to a truck.

Referring now to the drawings and more particularly to FIG. 1, it can be seen that a truck lid lift system according to the present invention is designated generally by the numeral 10. The truck lid lift system 10 is mountably affixed to a truck bed 12. Although the drawings are exemplary of a lid lift system used with a pickup truck, the present invention could also be practiced with any wheeled vehicle that has an opening which requires a covering. As is well known, the truck bed 12 has a tailgate 14 at one end that pivotally moves in relation to a floor 15 of the truck bed 12. The truck bed 12 also has upstanding interior walls 16, which have respective top edges 18.

Figure 6:
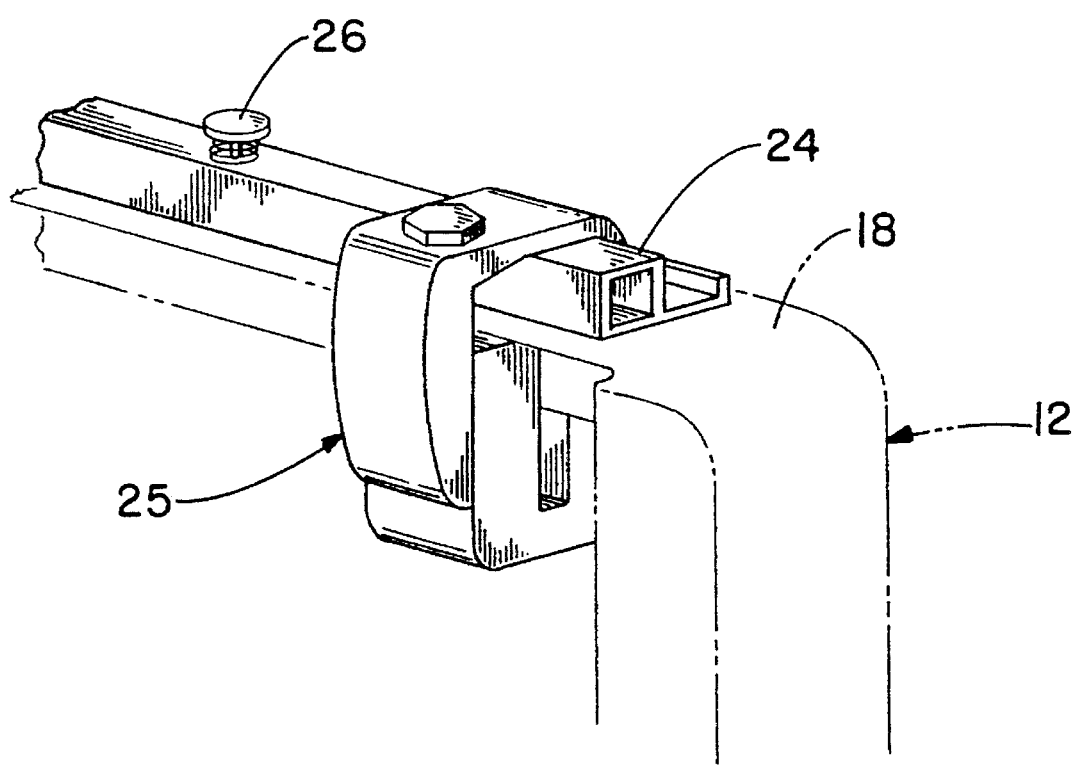
FIG. 6 is a partial perspective view illustrating the attachment of an edge rail of the lid lift system to a bed of a wheeled vehicle.

A lid rail assembly, designated generally by the numeral 20, is affixed to the truck bed 12. It should also be appreciated that the lid rail assembly 20 may be affixed to a bed liner that is disposed within the truck bed 12. The lid rail assembly 20 includes a hinge rail 22 at the end of the truck bed 12 opposite the tailgate end 14. Each end of the hinge rail 22 is substantially perpendicular to edge rails 24 that extend the length of the truck bed 12. As best shown in FIG. 6, the edge rails 24 are affixed to their respective top edges 18 by a plurality of strategically placed C-clamps 25. It will be appreciated that the C-clamps do not require holes to be drilled into the walls 16 or top edges 18. Accordingly, the truck lid lift system 10 may be securely installed and maintained while its use is desired, and then be subsequently removed without damage to the truck bed 12. It should also be appreciated that there may be a plurality of spring biased rail cushions 26 disposed along the length of the top edges 18.

Returning to FIG. 1, a closure member in the form of a truck lid, designated generally by the numeral 28, has at one end a lid hinge 30 which is pivotally mounted to the hinge rail 22. The truck lid 28 has at the end opposite the lid hinge 30 a downwardly extending gate ledge 32 that is in a bearing relationship with the tailgate 14 when both the tailgate and truck lid 22 are in their closed position. Likewise, a pair of rail ledges 34, which downwardly extend from the lid 28, are in a bearing relationship with a respective edge rail 24 when the truck lid 28 is in a closed position. The truck lid 28 also has a top surface 36 and an interior surface 38 which is opposed to the floor 15 of the truck bed 12 when the lid is in a closed position. As can be seen in FIG. 1, when the truck lid is in its open position, two slide rails, designated generally by the numeral 40, are securably disposed on the interior surface 38 of the truck lid 28. Typically, the truck lid 28 will be made of rigid plastic, fiberglass, or other composite material.

Figure 2:
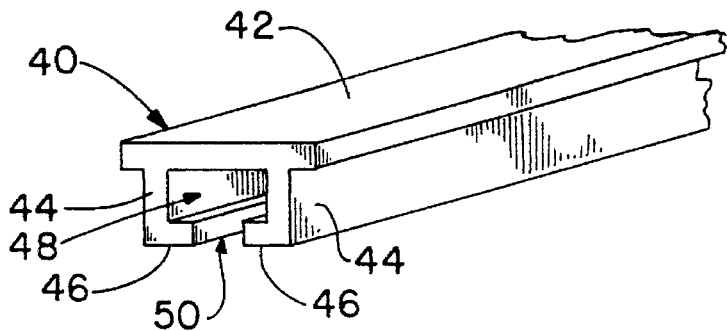
FIG. 2 is a perspective view of a slide rail which forms an integral part of the lid lift system shown in FIG. 1.

Referring now to FIG. 2, it can be seen that the slide rail 40 includes a base 42, which has two parallel downwardly extending channel walls 44. Inwardly extending from the channel walls 44 at their respective ends and perpendicular thereto, are a pair of retaining ledges 46. Thus, it can be seen that a slide channel 48 is formed by the channel walls 44 and the retaining ledges 46, there being an opening 50 at each end of the slide rail 40.

Figure 3:
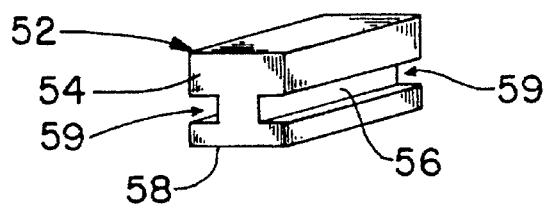
FIG. 3 is a perspective view of a slide member which is shaped for sliding engagement within the slide rail shown in FIG. 2.

As can be seen in FIG. 1 and FIG. 3, a slide member 52 is receivable within the slide channel 48 of the slide rail 40. The slide member 52 is made up of a top section 54, with a downwardly extending rib 56, which is integral with an outwardly extending clamp section 58. As can be seen in FIG. 3, the top section 54, the rib 56, and the clamp section 58 are configured in the shape of an I-beam with a receiving channel 59 disposed between the top section 54 and the clamp section 58. In the preferred embodiment, the slide rail 40 and the slide member 52 are made of plastic, which has a minimal co-efficient of friction and high durability.

Referring back to FIG. 1, it can be seen that a lift bar 60 is connected between the truck lid 28 and the truck bed 12. The lift bar 60 is made up of a lid arm 62 from which transversely extends a curvilinear extension arm 64 at one end. The extension arm 64 extends into a curvilinear section 66, there being a pivot bolt 80 at the vertex of the extension arm 64 and the section 66. A piston coupler pin 90 is disposed at the end of the curvilinear section 66. Substantially parallel with the curvilinear extension arm 64 is an extension arm 68 that is also transverse to the lid arm 62 and integral therewith. In a construction similar to the curvilinear extension arm 64, the extension arm 68 has a pivot bolt 80 that is substantially aligned with the pivot bolt 80 at the opposite side of lift bar 60.

Still referring to FIG. 1, it can be seen that a pair of arm mounting brackets 78 are affixed to the edge rails 24 in a well known manner. Typically, pivot bolts 80 will be used to secure the lift bars 60 at their respective pivot points in a manner well known in the art. The lift bar 60 is thus pivotable about the bolts 80. Typically, the lift bar 60 will be of tubular steel construction.

Figure 4:
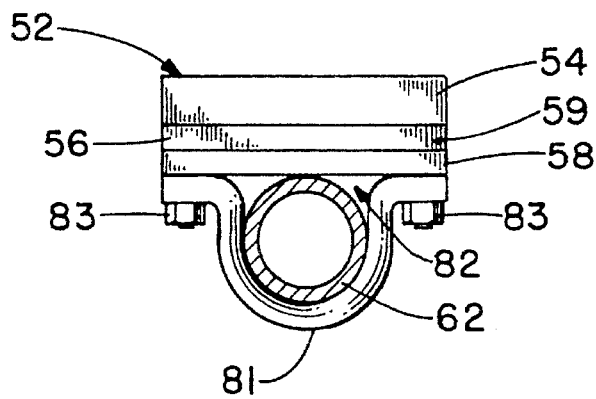
FIG. 4 is an elevational view illustrating the relationship as between a U-clamp, the slide member, and a lid lift bar of the system.
Figure 5:
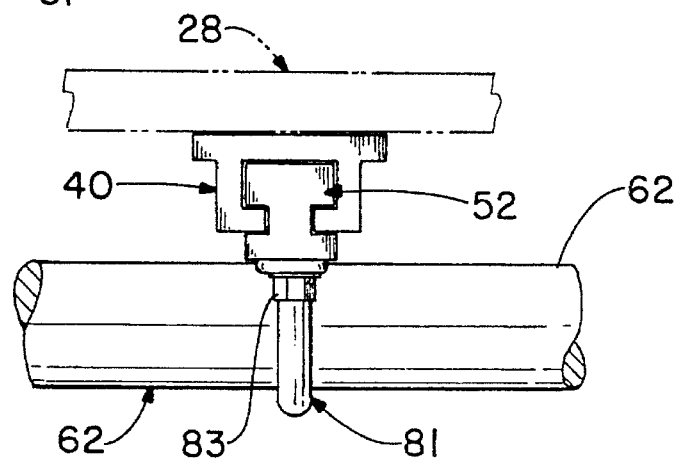
FIG. 5 is an end elevational view of the assembly comprising the slide rail, the slide member, the U-shaped clamp, and a lid lift bar as these are applied to raising and lowering of a lid closure.

Referring now to FIGS. 4 and 5, it can be seen that U-clamp 81 has a bar opening 82, which is formed when clamp screws 83 securably fasten the U-clamp 81 to the clamp section 58 of the slide member 52. It can also be seen that the lid arm 62 is secured to the slide member 52 by the U-clamp 81, and thus is slidable within channel 48 along the length of the slide rail 40.

Referring back to FIG. 1, a piston assembly, designated generally by the numeral 84, is mounted in a well known manner within the truck bed 12 for moving the lift bar 60 between an open and closed condition. The piston assembly 84 is affixed to an edge rail 24 by a piston mounting bracket 86. A lift piston 88 is detachably mounted to the curvilinear section 66 of the curvilinear extension arm 64 by a coupler pin 90. It should be appreciated that the coupler pin 90 pivotally secures the lift piston 88 to the curvilinear section 66. To actuate the piston assembly 84, a signal is received on wire 92 and in communication with a power supply 94 drives the piston 88 from a closed position to a fully stroked position. Although in the preferred embodiment the lift piston 88 is actuated electronically, other methods of actuation may be used such as the hydraulic system of a truck. It will further be appreciated that the lift piston 88 may be of various suitable types, such as hydraulic, pneumatic, or electro-mechanical. A suitable piston has been found to be an electro-mechanical hatch lift Model No. HL-800 by LENCO.

Therefore, in actual operation, an actuation signal is sent to the lift piston 88 by operator actuation of either a remote control or a toggle switch located in the cab of the vehicle. Once actuated, the lift piston 88 will extend, thus forcing the curvilinear extension arms 64 and 68 to rotate about the pivot bolts 80. Upwardly rotating, the curvilinear extension arm 64 will force the lid arm 62 to slidably move within the channel 48 within the slide rail 40. This movement is achieved because the lift bar 60 is received and retained within the U-clamps 81, which are attached to respective slide members 52. As will be appreciated by those skilled in the art, the slide member 52 easily moves within the slide channel 48 along its entire length of the slide rail 40. As the lift bar 60 is moved upwardly, the lid 28 will rotate upwardly at the lid hinge 30 until the lift piston 88 is fully actuated such that the lid is in the open condition. Once the truck lid 28 is in its fully extended and open position, the truck bed 12 may be accessed to either place equipment or valuables within the truck bed or remove the equipment or valuables therefrom. Upon completion of the work in the truck bed 12, the truck lid lift system 10 may be reactuated to close the truck lid 28 upon the truck bed 12.

Thus, to close the truck lid lift system 10, the piston 88 may either be released or reactuated, depending on its nature, thus pulling or allowing the curvilinear section 66 of the curvilinear extension arm 64 to move inwardly and downwardly. As described above, the lift bar 60 will then be slidably moved by virtue of its connection to the slide member 52 along the slide rail 40 until the lid is placed in its closed condition. To prevent damage to the truck lid 28, the hinge rails 22, and edge rails 24, a plurality of spring biased rail cushions 26 are integrally disposed along the length of the edge rails 24.

Thus, it can be seen that the objects of the invention have been satisfied by the structure presented above. It should be apparent to those skilled in the art that the objects of the present invention could be practiced in any size truck bed or adopted to perform in any fashion where the hinge rail is located on any one of the four sides of the truck bed or in a manner where the truck lid is not hingeably connected to the truck bed. Moreover, the present invention is adaptable to cover any size opening of a wheeled vehicle.

While the preferred embodiment of the invention has been presented and described in detail, it will be understood that the invention is not limited thereto or thereby. Especially, in that various materials and configurations may be used in the construction of the invention to meet the various needs of the end user. Accordingly, for appreciation of the true scope and breadth of the invention, reference should be made to the following claims.

What is claimed is:

1. A lid lift system, comprising:

a closure member mateably engageable with a bed of a wheeled vehicle;

a lid arm;

an extension arm integrally extending from said lid arm, said extension arm mounted to the wheeled vehicle bed;

a piston assembly securably mounted to said wheeled vehicle bed and having a lift piston actuable by an operator, said lift piston being mounted to said extension arm; and attachment means for interconnecting said lid arm to said closure member so that when said lift piston is activated, said closure member reciprocates between an open position and a closed position, wherein said attachment means comprises, at least one slide rail securably mounted to said closure member, said slide rail having a channel for slidably receiving a slide member, and a U-clamp secured to said slide member, said lid arm received within said U-clamp and said slide member, said lid arm moving said slide member and said closure member to a desired position when said lift piston is actuated.

2. A lid lift system according to claim 1, wherein said extension arm is pivotally mounted to said wheeled vehicle bed, said lift piston is pivotally mounted to said extension arm, and said closure member is hingedly mounted at one end to said wheeled vehicle bed.

3. A lid lift system according to claim 2, wherein said lid arm is tubular steel.

4. A lid lift system according to claim 2, wherein said slide rail and said slide member are plastic.

5. A lid lift system, comprising:

a lid rail assembly securably attachable to a truck bed, said lid rail assembly having a pair of edge rails substantially perpendicular to a hinge rail, said pair of edge rails secured to the truck bed;

a closure member mateably engageable with said lid rail assembly;

a lift bar slidably connected at one end to said closure member and pivotally mounted at an opposite end to said lid rail assembly, said lift bar having a lid arm from which extends at one end a curvilinear extension arm having a curvilinear section and at an opposite end an extension arm, said curvilinear extension arm pivotally mounted to one of said edge rails at the vertex of said curvilinear extension arm and said curvilinear section, and said extension arm pivotally mounted to the other of said edge rails; and a lift piston actuable by an operator, said lift piston mounted at one end to one of said edge rails and at the opposite end pivotally mounted to said curvilinear section to reciprocate said closure member between an open position and a closed position with respect to said lid rail assembly.

6. A lid lift system according to claim 5, wherein said lid arm is connected to said closure member by a slide rail assembly.

7. A lid lift system according to claim 6, wherein said slide rail assembly comprises:

at least one slide rail securably attached to said closure member, with a slidable member received therein; and a U-clamp securably fastened to said slidable member for receiving and retaining said lid arm such that when said lift piston is actuated, said lid arm slidably moves said closure member to a desired position.

8. A lid lift system according to claim 7, wherein said closure member is hingedly mounted at one end to said hinge rail.

9. A lid lift system according to claim 7, wherein said lift bar is tubular steel.

10. A lid lift system according to claim 7, wherein said slide rail and said slidable members are plastic.

11. A lid lift system for reciprocating a closure member upon a bed of a truck, comprising:

a lid rail assembly securably attachable to a truck bed, said lid rail assembly having a pair of edge rails substantially perpendicular to a hinge rail, said pair of edge rails secured to the truck bed;

a closure member mateably engageable with said lid rail assembly;

a lift bar rotatably connected at one end to said closure member and at an opposite end to said lid rail assembly, said lift bar having a lid arm from which extends at one end a curvilinear extension arm having a curvilinear section and at an opposite end an extension arm, said curvilinear extension arm pivotally mounted to one of said edge rails at the vertex of said curvilinear extension arm and said curvilinear section, and said extension arm pivotally mounted to the other of said edge rails;

a lift piston actuable by an operator, said lift piston mounted at one end to one of said edge rails and at the opposite end pivotally mounted to said curvilinear section; a lift piston actuable by an operator, said lift piston mounted at one end to one of said edge rails and at the opposite end pivotally mounted to said curvilinear section; and a slide rail assembly mounted to said closure member by at least one slide rail with a channel for slidably receiving a slide member, wherein said slide member is mounted to said lid arm and slidably moves when said lift piston is actuated to reciprocate said closure member between an open position and a closed position with respect to said lid rail assembly.

12. The lid lift system according to claim 11, wherein said slide rail assembly further comprises a U-clamp securably fastened to said slidable member for rotatably receiving said lift bar such that when said lift piston is actuated, said lift bar moves said slide member within said channel.

* * * * *